US007581403B2

(12) United States Patent
Deeks (10) Patent No.: US 7,581,403 B2
(45) Date of Patent: Sep. 1, 2009

(54) ENERGY STORAGE ARRANGEMENT

(76) Inventor: Daniel H. Deeks, 219 Littleworth La., Sea Cliff, NY (US) 11579

( * ) Notice: Subject to any disclaimer, the term of this patent is extended or adjusted under 35 U.S.C. 154(b) by 845 days.

(21) Appl. No.: 11/107,663

(22) Filed: Apr. 15, 2005

(65) Prior Publication Data

US 2008/0053833 A1 Mar. 6, 2008

(51) Int. Cl.
C25D 7/06 (2006.01)
F25B 21/00 (2006.01)
H01M 2/00 (2006.01)
H01S 3/00 (2006.01)
H01F 6/06 (2006.01)

(52) U.S. Cl. .................. 62/3.1; 205/155; 429/10; 372/37; 505/163

(58) Field of Classification Search .............. 62/3.1, 62/914, 600; 165/104.11; 204/155; 205/155; 372/37; 429/10; 505/163; 374/176
See application file for complete search history.

(56) References Cited

U.S. PATENT DOCUMENTS

| | | | | |
|---|---|---|---|---|
| 3,226,197 | A | * | 12/1965 | Lewis ........................ 436/59 |
| 4,150,552 | A | * | 4/1979 | Altman ....................... 62/467 |
| 4,315,832 | A | * | 2/1982 | Pastor et al. ............ 252/301.4 R |
| 5,113,661 | A | * | 5/1992 | Deeks ........................ 62/3.1 |
| 6,105,274 | A | * | 8/2000 | Ballantine et al. ............ 34/309 |
| 6,292,292 | B1 | * | 9/2001 | Garito et al. ............. 359/341.5 |
| 6,443,882 | B1 | * | 9/2002 | Wascher et al. ............... 600/9 |
| 6,983,620 | B2 | * | 1/2006 | Kaeppeler ................. 62/259.2 |
| 2003/0024122 | A1 | * | 2/2003 | Ichiyama et al. ............. 29/898 |

OTHER PUBLICATIONS

Kiessling et al., "Negative Specific Heat of a Magnetically Self-Confined Plasma Torus", PNAS, Feb. 18, 2003.
Young, J.B., et al., Physical Review Letters, vol. 77, No. 23, Dec. 2, 1996 "Sonoluminescence in High Magnetic Fields".
Grabert, H., et al., Physical Review B, vol. 36, No. 4, Aug. 1, 1987 "Quantum decay rates for dissipative systems at finite temperatures".
U.S. Patent No. 5,113,661, issued May 19, 1992, to Daniel H. Deeks, the same inventor of the subject patent application. This patent discloses the use of a high pressure anvil cell having diamond windows, and also discloses the use of metallic hydrogen as a base material, which requires that the base metallic hydrogen material be pressurized in a diamond anvil cell to attain the very high pressures required to produce metallic hydrogen.

(Continued)

*Primary Examiner*—Frantz Jules
*Assistant Examiner*—Travis Ruby
(74) *Attorney, Agent, or Firm*—Scully, Scott, Murphy & Presser, P.C.

(57) ABSTRACT

Energy is stored in the compression of a metastable degenerate Fermi electron gas contained in a compressed metallic base material subjected to a magnetic field in a high pressure cell. Heat energy is introduced to increase the energy of the compressed metastable degenerate Fermi electron gas. The increase in energy causes the magnetic field to increase so that the metastable degenerate Fermi electron gas is further compressed. Absorption of heat results in a decrease in the temperature. Energy can be withdrawn from The system by allowing the metastable degenerate Fermi electron gas to expand against the compressing magnetic field. To prevent development of fissures, the metallic base material is precompressed to provide an allowance for the volume of a metastable Fermi electron gas bubble to be created later.

29 Claims, 2 Drawing Sheets

OTHER PUBLICATIONS

E. M. Lifshitz, L. P. Pitaevskii, Statistical Physics, 3rd Edition, Part 2, vol. 9, Course of Theoretical Physics, 1980, § 63 on The de Haas-van Alphen effect, pp. 259-266.

E. M. Lifshitz, L. P. Pitaevskii, Statistical Physics, 3rd Edition, Part 1, vol. 5, Course of Theoretical Physics, 1980, § 12 on Pressure, pp. 41-44, particularly the paragraph on p. 44 starting with "It is easy to see . . . ", and § 21 on Thermodynamic inequalities, pp. 63-65.

L. D. Landau, E. M. Lifshitz, Electrodynamics of Continuous Media, vol. 8, Course of Theoretical Physics, 1960, § 38 on Magnetostriction of ferromagnetics, pp. 155-158.

D. Gugan, Martensitic Transformation of Lithium:Magnetic Susceptibility Measurements, Physical Review B, vol. 56, No. 13, 1997, pp. 7759-7762.

Amy Y. Liu et al, Structural Phase Stability and Electron-Phonon Coupling in Lithium, Physical Review B, vol. 59, No. 6, 1999, pp. 4028-4035.

H. Maris, S. Balibar, Physics Today on the Web, Negative Pressures and Cavitation in Liquid Hydrogen, Apr. 26, 2005, pp. 1-9.

J. Kloeppel, Temperature Inside Collapsing Bubble Four Times That of Sun, News Bureau, Apr. 26, 2005, pp. 1-2.

\* cited by examiner

ENERGY STORAGE ARRANGEMENT

BACKGROUND OF THE INVENTION

Field of the Invention

The present invention relates generally to a method and system of energy storage in which energy is stored in the compression of a cryogenic metastable degenerate Fermi electron gas contained in a compressed metallic base material such as lithium in a pressure containment vessel or cell that is subjected to a magnetic field to further compress the metastable degenerate Fermi electron gas.

More particularly, during operation of the present invention, heat energy in the form of phonons is used to increase the energy of the compressed metastable degenerate Fermi electron gas in a compressed metallic base material such as lithium. This increase in energy causes the metastable degenerate Fermi electron gas to increase its magnetic field which adds to and causes the overall magnetic field to increase. The increased magnetic field further compresses the metastable degenerate Fermi electron gas, which causes heat to be absorbed and results in a decrease in the temperature of the metastable degenerate Fermi electron gas. Energy can be withdrawn from the system by allowing the metastable degenerate Fermi electron gas to expand against the magnetic field.

SUMMARY OF THE INVENTION

Accordingly, it is a primary object of the present invention to provide a system and method for energy storage in which energy is stored by compression of a cryogenic metastable degenerate Fermi electron gas in a metallic base material in the presence of a magnetic field.

In accordance with the teachings herein, the present invention provides an energy storage system and method as described in which a pressure containment vessel or cell contains a pressurized and cryogenic metallic base material containing a metastable degenerate Fermi electron gas. A magnetic field is applied to the degenerate Fermi electron gas in the pressure containment cell to produce a further compression by magnetoconstriction of the metastable degenerate Fermi electron gas therein. The magnetic field, possibly in concert with an input laser beam, causes the degenerate Fermi electron gas to enter a metastable state, as required for operation of the present invention. Phonons or heat waves introduced into the metastable degenerate Fermi electron gas cause an increase in the magnetic field associated with the metastable degenerate Fermi electron gas, which adds to and increases the overall magnetic field, which further compresses the metastable degenerate Fermi electron gas. The applied magnetic field can be generated by superconducting magnetic coils and/or standard magnetic coils coupled in a magnetic circuit with the pressure cell. Phonons or heat waves introduced into the metastable degenerate Fermi electron gas can be converted to electromagnetic energy by the magnetic circuit by the increased current in the coils of the magnetic circuit which can be utilized to drive an electrical load coupled in series or parallel therewith.

The present invention is directed to an energy storage arrangement using a metastable degenerate Fermi electron gas formed in a base material such as lithium having the following properties. The base material must be metallic at the operating pressures of the system. The base material must be sufficiently compressible such that a metastable less dense region or bubble can be formed therein. The base material must have characteristics such that the formation of fissures and/or plates can be prevented or limited/mitigated by precompression when the base material is cooled and/or subjected to a magnetic field. The base material must obey Fermi statistics at the cryogenic operating temperatures of the system, with the Fermi statistics being a result of the degenerate electron gas.

Lithium is a preferred base material. Other possible suitable base materials include hydrogen, although hydrogen must be pressurized approximately 100 times greater than lithium to achieve a metallic state, and sodium, although sodium is not as compressible as lithium because of the shell layers of electrons of sodium.

The present invention specifically provides for a precompression of the base material prior to cryogenic cooling of the base material. In the case of lithium, cryogenic cooling of unpressurized lithium causes it to go from a BCC (Body Centered Cubic) crystalline structural state to a 9R/Hex crystalline structural state, while developing "fissures" because of the size difference between those two structural states. To prevent this, the present invention precompresses the lithium, to provide an allowance for the volume of a metastable bubble to be created later. The lithium is precompressed so that once the metastable bubble is formed, the majority of the lithium will be in the 9R/Hex structural state. In the 9R/Hex structural state the lithium is still very compressive. Note that the lithium is still composed of a multi-crystalline mixture of structural states. The precompression of the lithium pursuant to the teachings of the present invention substantially prevents or limits subsequent fissuring of the lithium.

Additionally, the precompression not only prevents fissures from developing on cooling of the lithium base material, but also prevents or possibly limits Condon/de Haas-Van Alpen plating from occurring. "Statistical Physics", $3^{rd}$ Edition, Part 2, by Landau and Lifshitz, and "Course of Theoretical Physics", Volume 9, by E. M. Lifshitz and L. P. Pitaevskii, § 63, page 266, discuss " . . . the sample is a flat plate in a magnetic field perpendicular to it, the body separates into alternating layers (diamagnetic domains) with different values of induction."

The energy storage arrangement of the present invention can also be used for refrigeration in which mode heat energy is absorbed by further compression of the metastable degenerate Fermi electron gas, and/or by an increase in the magnetic field compressing the metastable degenerate Fermi electron gas.

One embodiment of the present invention employs a plurality of metastable units in a multi-unit system to increase the combined half-lives of the plurality of units in the system. When this multi-unit system embodiment is used in a refrigeration mode, one energy storage unit can be used to cool or re-cool other energy storage units to their cryogenic operating temperature.

In one preferred embodiment, a laser is used to direct a laser beam through the high pressure containment cell to vaporize a portion of the metallic base material therein to form the metastable degenerate Fermi electron gas from the degenerate Fermi electron gas.

BRIEF DESCRIPTION OF THE DRAWINGS

The foregoing objects and advantages of the present invention for an energy storage arrangement may be more readily understood by one skilled in the art with reference being had to the following detailed description of several preferred embodiments thereof, taken in conjunction with the accompanying drawings wherein.

DETAILED DESCRIPTION OF THE INVENTION

Figure 1:
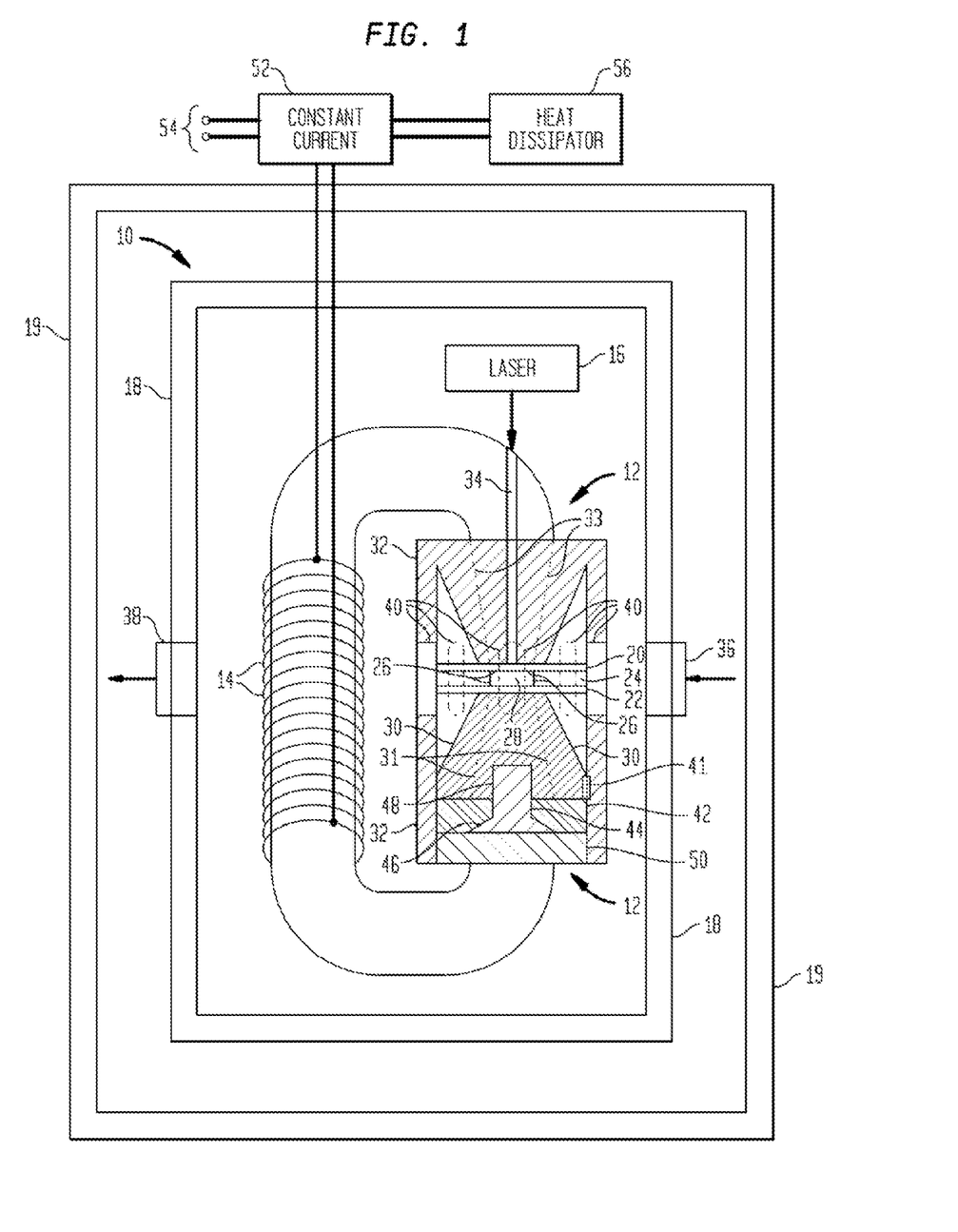
FIG. 1 illustrates a cross sectional view of one embodiment of an energy storage unit pursuant to the present invention comprising a high pressure containment cell, with a magnetic circuit and a laser, to initiate a metastable state of a degenerate Fermi electron gas in lithium in the high pressure cell.

Referring to FIG. 1 in detail, there is illustrated a cross sectional view of one embodiment of an energy storage unit or system pursuant to the teachings of the present invention. The energy storage unit 10 comprises a high pressure containment cell 12, coupled in a magnetic circuit with magnetic coils 14, and also having a laser 16 to produce a laser beam to initiate a metastable state of a degenerate Fermi electron gas in a base material sample such as lithium mounted in the high pressure containment cell 12, all positioned within an external insulated cryostatic vessel 18. The following detailed description concerns a preferred base material of lithium, although it should be realized that the present invention is applicable to other base materials as well.

Pressure containment cells are well known in the art in general, and are used in high pressure research with both high and low temperatures to study the physics of high pressure phenomena, including metal-semiconductor transitions, electronic transitions, phonons and high-pressure lattice dynamics, and phase transitions.

In the illustrated embodiment of the present invention, the high pressure containment chamber or cell 12 includes an upper, cut sapphire or diamond window 20 and an optional lower, cut sapphire or diamond window 22, with a metal sample gasket 24 positioned therebetween which defines a cylindrical sample chamber 26 therein for holding a lithium sample 28. The high pressure within the containment chamber 12 is created by a hardened steel anvil piston 30 positioned within and being compressed against a hardened steel cylindrical body 32 of the high pressure chamber or cell 12.

The laser 16 is positioned to direct a laser beam through a small laser beam penetration aperture 34 that extends to the upper window 20 of the cylindrical lithium sample chamber 26 to assist in forming a metastable state in a degenerate Fermi electron gas in the lithium sample 28. FIG. 1 illustrates an embodiment wherein a laser beam is directed into the lithium sample through only the upper window. Alternative embodiments might also direct a laser beam into the lithium sample through the lower window.

The laser penetration aperture 34 is preferably slightly offset from the center of the cylindrical metal core, and/or the lithium containment gasket 24 can have projections into the lithium sample, to prevent possible rotation of the doped lithium sample. Note that if either of these features were not incorporated, the doped lithium sample between the two anvil windows might rotate around its cylindrical axis.

U.S. Pat. No. 5,113,661, by the same inventor, discloses the use of a high pressure anvil cell having diamond windows. The use of sapphire as a replacement for diamond in the window(s) of the high pressure containment cell can provide a substantial cost savings.

A magnetic circuit through the high pressure containment chamber 12 is formed by a ferromagnetic loop having magnetic coils 14 therearound, which could be standard coils or superconducting coils. The ferromagnetic loop extends to the upper and lower ends of the high pressure containment chamber 12 and forms a magnetic circuit which passes through the lithium sample 28.

In the illustrated embodiment, the portion of the cylindrical steel body 32 and the portion of the steel anvil piston 30 that lead to and from the lithium sample 28 each have a frusto-conical shape to direct and concentrate the magnetic lines of flux toward the lithium sample. In alternative embodiments, this effect might be accentuated even further by constructing the cylindrical body 32 and the anvil piston 30 from both ferromagnetic steel and a non-ferromagnetic material such as brass. For example, the inner portion of the frusto-conical shape cylindrical steel body 32 within dashed lines 33 could be formed of ferromagnetic steel and the outer portion outside the dashed lines 33 could be formed of a non-magnetic material such as brass, and the inner portion of the frusto-conical shape anvil piston 30 within dashed lines 31 could be formed of ferromagnetic steel and the outer portion outside the dashed lines 31 could be formed of a non-magnetic material such as brass.

Metallic lithium is non-magnetic, and it may therefore be desirable to dope or alloy the lithium with iron to increase the magnetic susceptibility of the lithium. ["Martensitic Transformation Of Lithium: Magnetic Susceptibility Measurements", by D. Gugan, Physical Review B, Volume 56, Number 13].

A cryogenic cooling circuit is formed within the cryostatic vessel 18, which typically has vacuum or other insulated walls, extending from an input port 36 to an output port 38, through which a suitable cryogenic cooling fluid such as liquid nitrogen is circulated around the lithium sample 28 contained within the sample chamber 26 to supply cryogenic cooling therefor. The cryostatic cooling circuit includes a low temperature input port for the cryostatic fluid (e.g. liquid nitrogen) coming from a heat absorber/radiator, and a high temperature output port 38 for the cryostatic fluid to provide a return to the heat absorber/radiator. The cryostatic cooling circuit includes a cryostatic vessel 18 to house and insulate the cryogenicly cooled components, and the laser 16 can be located outside or within the cryostatic vessel 18. It should be realized that the cryogenic cooling circuit can be utilized to remove heat from or add heat to the lithium sample, depending upon the particular process requirements, and that the term heat is a relative term that does not necessarily imply elevated temperatures.

The steel cylindrical body 32 has a number of circumferentially spaced cooling apertures 40 formed therein around the sample chamber 26 to allow the cryogenic cooling fluid to flow through the steel cylindrical body 32 in close proximity to the sample chamber 26 and lithium sample 28. The cryogenic cooling circuit preferably includes flow ducts (not illustrated) extending from the input port 36 to the circumferentially spaced cooling apertures 40 of the steel cylindrical body 32 and then from the circumferentially spaced cooling apertures 40 of the steel cylindrical body 32 to the output port 38. The cryogenic cooling circuit preferably cools the lithium sample 28 in the sample chamber 32 prior to cooling other components such as the magnetic coils 14.

FIG. 1 also illustrates an alternative embodiment having a second outer cryostatic cooling vessel 19 which may be desirable in some embodiments. A cooling circuit for the second outer cryostatic cooling vessel might be operated with a cryogenic cooling fluid such as liquid hydrogen or liquid helium.

An energy storage arrangement pursuant to the subject invention preferably utilizes lithium of any isotope. Initially, a doped and/or alloyed lithium sample 28 is placed in the sample chamber 26 of the high pressure containment cell 12.

The present invention specifically provides for a precompression of the lithium sample 28 prior to cryogenic cooling thereof. The literature ["Structural Phase Stability And Electron-Phonon Coupling In Lithium", by Amy Y. Liu et al., Physical Review B, Volume 59, Number 6, Page 4028] discusses the different martensitic phase changes in lithium. Cooling of unpressurized lithium causes it to go from a BCC (Body Centered Cubic) crystalline structural state to a 9R/Hex crystalline structural state, while developing "fissures" because of the size difference between those two structural states.

The present invention prevents the development of such fissures by precompressing the lithium sample 28 to provide an allowance for the volume of the metastable bubble to be created later. The lithium is precompressed so that once the metastable bubble is formed, the majority of the lithium will be in the 9R/Hex structural state. In the 9R/Hex structural state the lithium is still very compressive. Note that the lithium is still composed of a multi-crystalline mixture of structural states. The precompression of the lithium pursuant to the teachings of the present invention substantially prevents or limits subsequent fissuring and/or plating of the lithium. It should be noted that such fissures would prevent the rapid transportation of heat (phonons) in the lithium. The phonon speed in the BCC structural state is greater than the phonon speed in the 9R/Hex structural state, but this difference is negligible compared to the loss of phonon transport caused by the fissures.

The precompression of the lithium pursuant to the teachings of the present invention can be accomplished in many different ways, and many different types of pressure containment cells are known and available in the art that can provide for precompression of the lithium.

Pursuant to the embodiment shown in FIG. 1, the lithium sample 28 is precompressed in the sample chamber 26 formed in the metal sample gasket 24 between the upper and lower windows 20, 22 between a planar face formed at the inner end of the portion of the cylindrical outer body 32 extending to the upper window 20 and a planar face formed at the inner end of the anvil piston 30 extending to the lower window 22. The anvil piston 30 and the inside cylindrical surface of the cylindrical outer body 32 each include a vertically extending groove in which a key 41 is positioned to prevent any rotation of the anvil piston 30 relative to the cylindrical outer body 32, to prevent the generation of undesirable eddy currents during operation of the present invention.

The lithium sample 28 is precompressed in the sample chamber 26 by a core compression plug 42 having exterior threads that threadedly engage interior threads formed on the inside cylindrical surface of the lower portion of the cylindrical outer body 32. The core compression plug 42 is provided with a slot or other torque applying/engaging means (not illustrated) on its lower surface by which the core compression plug can be rotated and threadedly tightened against the lower end of the anvil piston 30 to compress the lithium sample 28 in the sample chamber 26 between the planar face formed at the inner end of the cylindrical outer body 32 and the planar face formed at the inner end of the anvil piston 30. The core compression plug also includes an axially extending central aperture 44 that can be countersunk to accommodate a threaded screw/bolt 46 that threadedly engages an axially extending, central threaded aperture 48 in the bottom surface of the anvil piston 30.

To precompress the lithium sample 28, the core compression plug 42 is rotated and threadedly tightened against The lower end of the anvil piston 30 without the threaded screw/bolt 46 being present. A mechanical or hydraulic press, as is often associated with pressure containment cells, is then inserted through the axially extending central aperture 44 in the core compression plug 42 to compress the anvil piston 30 against the cylindrical outer body 32 with the lithium sample 28 being precompressed therebetween. After a desired amount of precompression of The lithium sample 28 is attained, The core compression plug 42 is Then threadedly tightened against the anvil piston to maintain The precompression, and The press is then removed from The axially extending central aperture 44 in the core compression plug 42. The threaded screw/bolt 46 is then threaded into the central threaded aperture 48 of the anvil piston 30 and tightened to lock the two components together. One or more further threaded locking plugs 50 can be threadedly tightened against The lower end of the core compression plug 42 to further lock The components in place against the precompressed lithium sample 28.

The energy storage unit is then cooled by the cryogenic cooling circuit to a cryogenic temperature below the temperature at which the Fermi statistics of the degenerate electron gas in the metallic lithium predominate over the Bose statistics of the degenerate Fermi electron gas.

The cryogenic temperatures required for operation of the present invention are dependent upon several parameters, including the density of the metallic lithium and the strength of the magnetic field applied to the metallic lithium.

Fermi and Bose statistics and the similarities and distinctions therebetween are well recognized in the art, and a comprehensive discussion of Fermi and Bose distributions as are applicable to the present invention can be found in STATISTICAL PHYSICS, 1980, Part 1, by Landau and Lifshitz, Chapter 5, on Fermi and Bose Distributions.

After the lithium sample 28 is precompressed and cooled to the necessary cryogenic temperature, a laser beam is directed through one or both of the sapphire/diamond windows to create a bubble in the center region (may be offset) of the lithium sample 28 by vaporizing the lithium.

The laser 16 is selected to produce a frequency/wavelength laser beam that is readily absorbed by the 9R/Hex metallic lithium so that heat is readily absorbed by the 9R/Hex metallic lithium, with a $CO_2$ laser being one suitable laser.

U.S. Pat. No. 5,113,661, by the same inventor, discloses the use of metallic hydrogen as a base material which requires that the base metallic hydrogen material be pressurized in a diamond anvil cell to attain the very high pressures required to produce metallic hydrogen.

With the present invention, which discloses and teaches the use of 9R/Hex metallic lithium as a base material, the necessary pressure in the containment vessel/cell is reduced to approximately 7 GPa (Giga-Pascals), or about 10,000 PSI. This makes the use of a two faced diamond anvil cell not really necessary. One embodiment of the present invention can utilize a similar small pressure containment vessel with a single crystalline window. This embodiment still requires laser access to at least one side of the doped lithium sample to be able to create the negative pressure bubble.

The basic principle of operation of the pressure containment chamber or cell is relatively simple. A lithium sample is placed inside a compressible washer (magnetic or nonmagnetic, nonmagnetic may be preferred) between the flat parallel faces of opposed plates or disks, at least one of which provides a sapphire or diamond window, and is subject to pressure when an applied force compresses the two opposed plates together. Variations in the construction of different pressure cells arise from the different ways in which the force-generating and the plate alignment mechanisms are designed.

The metastability within the degenerate Fermi electron gas is formed as a less dense medium, possibly a bubble, possibly located at the center of the base material rather than as a toroidal bubble surrounding the base material. In one embodiment, the bubble of metastable degenerate Fermi electron gas can be formed with a laser beam from laser 16 which vaporizes the base material to form the bubble.

A laser beam is directed through one or both of the sapphire/diamond windows to create a bubble in the center region (may be offset) of the lithium sample by vaporizing the lithium. The use of the laser to create this bubble has multiple effects.

First, it causes the metastability (e.g. the bubble) to be created inside the lithium.

Secondly, the heat from the laser and vaporization cause the remaining lithium to be heat annealed, reducing and possibly eliminating any internal stresses and microscopic fissures that are present in the lithium.

Thirdly, because the vaporized lithium has a larger volume, the remaining lithium is under a greater pressure since a portion of its original volume is now occupied by the metastable bubble. This greater pressure is desirable to prevent microscopic fissures from developing, and crystalline states other than 9R/Hex from being thermodynamically favored as the lithium is cooled and heated.

The lithium together with the metastable bubble are then subjected to a constraining (constricting) magnetic field produced by the magnetic coils 14. It may be desirable to subject the lithium to the magnetic field while the laser is still on. The constraining magnetic field produces a greater magnetic pressure on the non-vaporized lithium than the non-vaporized lithium exerts on the bubble. The lithium is therefore now subjected to a negative pressure with respect to the magnetic field. It is this negative pressure that drives the process. The laser is then turned off.

The system is then cooled down again to its normal cryogenic operating temperature.

The metastability (i.e. the bubble) within the lithium is maintained by controlling two opposing simultaneous physical forces (processes), the magnetostriction of the doped lithium causing a negative pressure, and the tendency of the compressed 9R/hex lithium to expand.

The magnetostriction of the magnetic field exerts a greater pressure on the lithium than the lithium exerts on the magnetic field, and thus the lithium is subject to a negative pressure. The result is $$\partial S/\partial V < 0,$$

for the lithium, wherein S=entropy and V=volume ["Statistical Physics", $3^{rd}$ Edition, Part 1, by Landau and Lifshitz, "Course of Theoretical Physics", Volume 5, by E. M. Lifshitz and L. P. Pitaevskii, § 12 Pressure, page 44]. Thus the 9R/Hex metastable lithium must spontaneously contract to increase its entropy.

Phonons in the lithium result in an increase in volume of the lithium, but because the lithium is under a negative pressure, any increase in volume would lead to a decrease in entropy. Thus phonons present in the contracting lithium raise the degeneracy of the electron gas in the metastable lithium but do not raise the temperature of the doped/alloyed lithium. In increasing the degeneracy of the metastable degenerate electron gas in the lithium, the magnetic field also increases. This increase in magnetic field results in an increase in the current in the magnetic coils.

Phonons in the 9R/Hex lithium result in compression of the 9R/Hex lithium. The compressed 9R/Hex lithium expanding against the magnetic field does not heat up because the energy is removed via the magnetic field. The magnetic field is relaxed by drawing current (energy) from the superconducting coils, and thus the lithium is under $$\partial S/\partial V > 0.$$

Note that the metastability is a state of partial equilibrium as both of these processes are occurring simultaneously.

This discussion has not yet considered zero point energy. "Given that Li is such a light atom, finite-temperature effects arising from vibrational degrees of freedom are likely to play a role in the structural energy of this system" ["Structural Phase Stability And Electron-Phonon Coupling In Lithium", by Amy Y. Liu et al., Physical Review B, Volume 59, Number 6, Page 4028]. Thus all zero point energy vibrational effects are directly linked to a volumetric or degenerate effect, and we have seen above that for $\partial S/\partial V < 0$, there is no increase in temperature.

The system is then substantially self-maintaining at the cryogenic temperature as ambient heat absorbed by the system manifests itself as additional phonons in the metastable degenerate Fermi electron gas. The additional phonons introduced into the metastable degenerate Fermi electron gas cause an increase in the magnetic field associated with the metastable degenerate Fermi electron gas, which adds to and increases the overall magnetic field, which further compresses by magnetoconstriction the metastable degenerate Fermi electron gas. This increased magnetic field compresses the metastable degenerate Fermi electron gas, which does not heat up because of this compression but increases its degeneracy. The metastable state of this system is metastable within specific limits.

For this system, there exists both a minimum and a maximum compression of the metastable degenerate Fermi electron gas. The minimum magnetic compression is that magnetic field necessary to maintain the metastable bubble. The maximum magnetic compression is that magnetostrictive compression produced by the magnetic field such that any larger magnetic field would be above the critical field (i.e. above the critical current) of the superconducting magnetic coils. In embodiments with non-superconducting magnetic coils, the maximum magnetic compression would be the condition that the resistive effect of the coils produces more heat than can be absorbed by the metastable lithium.

Further, a metastable system has a half life associated therewith, and in different embodiments, this half life may be lengthened by doping the lithium with ferromagnetic (or other elements) impurities to increase the magnetic susceptibility of the lithium ["Martensitic Transformation Of Lithium: Magnetic Susceptibility Measurements", by D. Gugan, Physical Review B, Volume 56, Number 13].

In absorbing phonons, the temperature of the metastable degenerate Fermi electron gas decreases, and preferably is used as a heat sink for the superconducting and/or standard conducting coils 14, as well as any components of the system subject to resistive (impedance) heating. A cryogenic fluid in the cooling circuit is preferably used for cooling and for the conduction of heat to and from the system. Moreover, one operative energy storage system could be used as a heat sink to cool another energy storage system to its cryogenic operating temperature. In this capacity, the system of energy storage and recovery of the present invention can be used as a refrigeration system.

Energy can be removed from the system by allowing the current in the superconducting and/or standard conducting coils 14 to pass through an external impedance. The external impedance can be in series with the superconducting and/or standard conducting coils, and/or could also be in parallel therewith. The external resistance associated with the coils controls the expansion or compression of the metastable degenerate Fermi electron gas. One advantage of a parallel external resistance is that it can be used to control the current and/or voltage in the coils.

The current produced by this embodiment is direct current. Therefore, it may be necessary to convert the direct current to an alternating current, or change the voltage or amperage before passing it through a power distribution network.

FIG. 1 also illustrates the metastable energy storage system as having a constant current circuit 52 that is provided to assure that the current through the superconducting or standard magnetic coils 14 is within those limits necessary to maintain the metastable bubble in the lithium but not higher than the critical current of the superconducting or standard magnetic coils 14. If a resistive load is not present at the circuit DC current output 54, then the over-current is directed to a resistive heat dissipator/radiator 56 that is provided to dissipate excess energy (i.e. over-current) from the superconducting or standard magnetic coils 14.

In some embodiments, the amount of energy that the system is able to store may possibly be increased by doping or alloying the base lithium material with additional elements that add additional electrons to the metastable degenerate Fermi electron gas to make it more incompressible.

The metastability of the lithium is maintained by controlling two opposing simultaneous physical forces (processes), the magnetostriction of the doped lithium causing a negative pressure and the tendency of the compressed 9R/hex lithium to expand.

Figure 2:
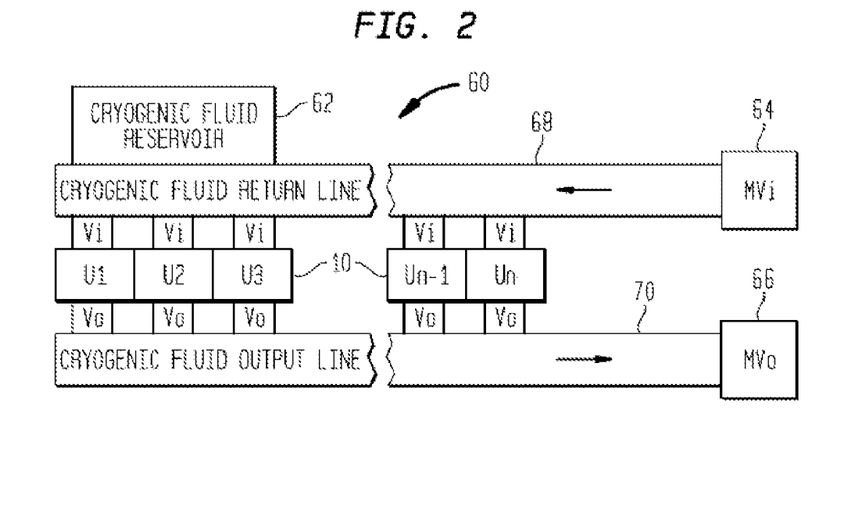
FIG. 2 illustrates an embodiment of the present invention which includes a grouping of a plurality of energy storage units, as shown in FIG. 1, in a multi-unit system having a common cryogenic cooling system, to increase the combined half-lives of the plurality of units in the system.

FIG. 2 illustrates an embodiment of the present invention which includes a grouping of a plurality of metastable units 10, shown as U1, U2 . . . Un, in a multi-unit system 60, in a multi-unit system having a common cryogenic cooling system, to increase the combined half-lives of the plurality of units in the system. The energy storage units are metastable and thus have half-lives associated with them. Thus, when any given unit of the grouping in the system decays, the other units of the system cool down the decaying unit, and can reset the decaying unit by supplying electrical power for operation of the decaying unit including its laser(s) and its magnetic field. In this embodiment, the true probability of failure of a grouping of a plurality of units in one system is the probability that all of the units would fail at the same instance, which is minimal.

The multi-unit system 60 includes a common cryogenic cooling system that comprises an internal cryogenic fluid reservoir 62, and a main input valve 64 and main output valve 66 coupled to an external heat absorber/radiator (not illustrated). A cryogenic fluid input line 68 leads from the input valve 64 to a plurality of individual input valves vi for the plurality of metastable units U1, U2, . . . Un, each of which has an individual output valve vo to a cryogenic fluid output line 70 leading to the main output valve 66.

Figure 3:
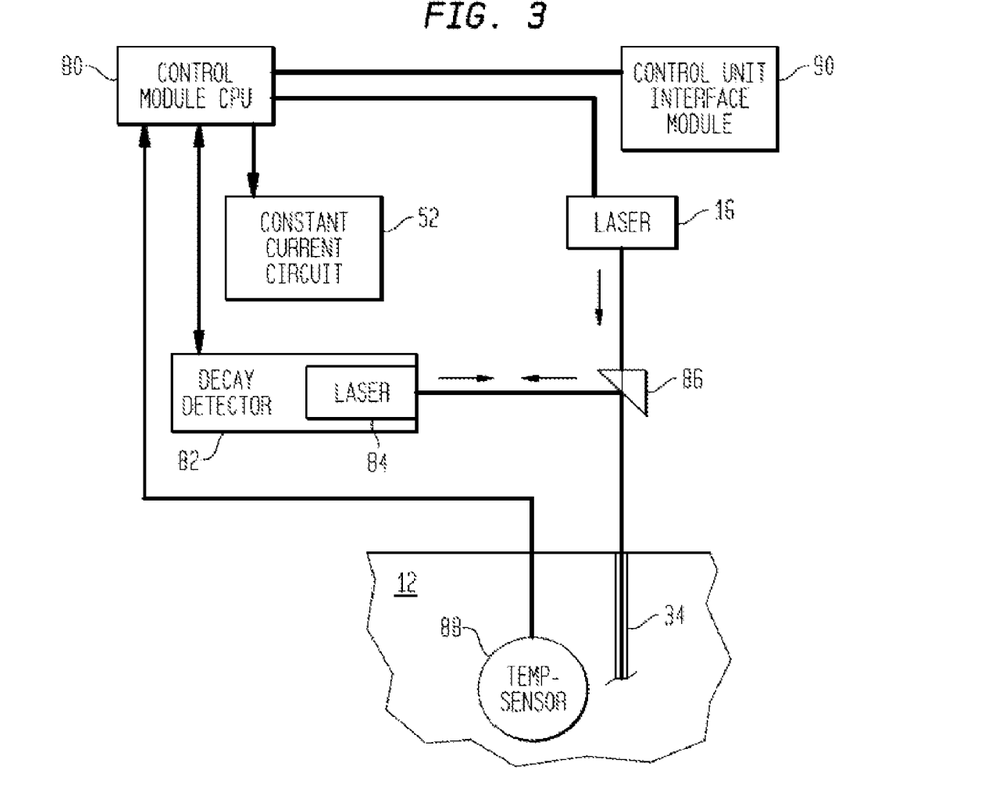
FIG. 3 is a schematic illustration of a control system for an energy storage unit pursuant to the present invention wherein a control module CPU controls and regulates the operation of the several components of the energy storage unit.

FIG. 3 is a schematic illustration of a control system for an energy storage system pursuant to the present invention wherein a control module CPU 80 controls and regulates the operation of the several components of an energy storage unit 10 including a laser 16 and a constant current circuit 52, as explained above. An energy storage system of the present invention is metastable and will ultimately decay, and desirably should have a mechanism to detect when the metastable bubble is not present and thus needs to be created (i.e. the system needs to be reset). A decay detector unit 82 is provided to accomplish this function, and includes a YIG or YAG laser 84 that directs a very low intensity laser beam into the metastable bubble volume at a regular interval via a half silvered mirror and/or prism 86. The intensity and frequency of this very low intensity decay detector laser is such that the laser beam from the laser 84 is reflected back to the decay detector unit 82, and does not measurably or substantially heat up the lithium when directed into the bubble. If the metastable bubble is not present, then the laser light is reflected back from the lithium. However if the metastable bubble is present, then the laser light is reflected back partially by the metastable bubble, and partially by the ferromagnetic anvil piston 30. The difference in the reflected light, if the metastable bubble is present, or if the metastable bubble is not present and needs to be created (i.e. the system needs to be reset), is detected by the decay detector unit 82 that detects the laser light reflected back, and this information is sent to the control module CPU 80.

In between these low intensity laser pulses when the metastable bubble is not being illuminated, or in lieu thereof, the decay detection unit 82 or a separate detection unit can also monitor the temperature of the lithium base material and/or metastable bubble via its emitted black body radiation. Alternatively or additionally, a separate temperature sensor 88 can be provided to monitor the temperature of the lithium in the sample chamber of the pressure containment chamber 12. The decay detector unit 82 and separate temperature sensor 88 provide inputs to the control module CPU which controls the reset process (cooling, creation of the metastable bubble, applying the magnetic field, and re-cooling to the units operational temperature).

Moreover, the control module 80 of one energy storage unit 10 can be connected to the control module 80 of another energy storage unit 10 through a control unit interface module 90. The control module 80 of one operational unit 10 can also act as a master control module to control the reset of another energy storage unit 10. The control module 80 of the unit(s) being reset operates in a slave mode and is controlled and directed by the master control module. Once operational, the slave state control module unit discontinues its slave mode of operation, and operates in a normal control mode, and can itself become a master control module to control the reset of another energy storage unit 10.

The present invention is directed to an energy storage arrangement using lithium. However, a suitable metastable degenerate Fermi electron gas may be formed in base materials other than lithium, such as hydrogen and/or sodium, having the following properties:

(a) The base material must be metallic at the operating pressures of the system.

(b) The base material must be sufficiently compressible so that a metastable less dense region or bubble can be formed.

(c) The formation of fissures and/or plates that may occur when the base material is cooled and/or subjected to the magnetic field can be prevented by precompression.

(d) The base material must obey Fermi statistics at the cryogenic operating temperatures of the system, with the statistics being a result of the degenerate Fermi electron gas.

(e) The base material must be susceptible to the magnetic field so that the bubble can be maintained for a period of time (half life).

While several embodiments and variations of the present invention for an energy storage arrangement are described in detail herein, it should be apparent that the disclosure and teachings of the present invention will suggest many alternative designs to those skilled in the art.

What is claimed is:

1. A system for energy storage in a metastable energy storage unit, said system comprising:
    a metallic base material that is metallic at an operating pressure of a system and including a metastable bubble therein;
    a metastable degenerate Fermi electron gas located in said metallic base material, obeying Fermi statistics, and subjected to a magnetic field, wherein energy is stored by compression of said metastable degenerate Fermi electron gas that is subjected to said magnetic field;
    a high pressure containment vessel containing said metallic base material and said metastable bubble;
    a cryogenic cooling system for cryogenically cooling said metallic base material in said high pressure containment vessel;
    a magnetic system for applying a magnetic field to said metallic base material in said high pressure containment vessel, wherein said metallic base material subjected to a negative pressure exerted by said magnetic field, wherein $\partial S/\partial V<0$, and wherein S is entropy of said metallic base material and V is volume of said metallic base material; and
    a decay detector unit including at least one of a laser sensor and a black body radiation sensor, wherein said decay detector unit detects whether said metastable bubble is present or not present in said metallic base material by monitoring a cryogenic operating temperature of said system, wherein said laser sensor detects a reflected laser beam from said metastable bubble, and wherein said black body radiation sensor monitors said cryogenic operating temperature of said metallic base material or said metastable bubble via emitted black body radiation from said metastable bubble.

2. The system for energy storage as claimed in claim 1, wherein said metallic base material comprises lithium, and said metallic base material is precompressed prior to cryogenic cooling of said metallic base material to provide an allowance for a volume of said metastable bubble, wherein a major portion of said metallic base material is in a 9R/Hex crystalline structural state when cooled, and wherein cooling of said precompressed metallic base material causes it to transform from a BCC (Body Centered Cubic) crystalline structural state to a predominately 9R/Hex crystalline structural state without substantial development of fissures caused by a size difference between the BCC and 9R/Hex crystalline structural states.

3. The system for energy storage as claimed in claim 2, wherein said metallic base material comprises metallic lithium of any isotope that is alloyed and/or doped.

4. The system for energy storage as claimed in claim 1, wherein when a given metastable energy storage unit of the plurality of metastable energy storage units in the multi-storage unit system decays, the other metastable energy storage units in the multi-storage unit system cool down said decaying metastable energy unit and assist in resetting said decaying metastable energy unit by supplying electrical power to at least one of a laser for said decaying metastable energy unit or a magnetic field for said decaying metastable unit.

5. The system for energy storage as claimed in claim 1, further including a processor that is responsive to said decay detector unit to reset said metastable energy storage unit if said metastable bubble is not present.

6. The system for energy storage as claimed in claim 1, further comprising a laser for directing a laser beam through said high pressure containment vessel to vaporize said metallic base material therein to form said metastable bubble, wherein said decay detector unit includes:
    a second laser that directs a low intensity laser beam into said metallic base material, wherein said low intensity laser beam does not substantially heat up said metallic base material; and
    a laser sensor that detects a reflected laser beam from said metastable bubble.

7. A method for energy storage in a metastable energy storage unit comprising:
    subjecting a metallic base material to a high pressure in a high pressure containment vessel;
    precompressing said metallic base material prior to cryogenic cooling of said metallic base material;
    cryogenically cooling said metallic base material in said high pressure containment vessel;
    forming a metastable bubble in said metallic base material, wherein a degenerate electron gas that obeys Fermi statistics is formed within said metallic base material;
    applying a magnetic field to said metallic base material in said high pressure containment vessel to produce a compression of the metastable degenerate Fermi electron gas in the metallic base material, wherein said metallic base material is subjected to a negative pressure exerted by said magnetic field, wherein $\partial S/\partial V<0$, and wherein S is entropy of said metallic base material and V is volume of said metallic base material; and
    detecting whether said metastable bubble is present or not in said metallic base material by employing a decay detector unit including at least one of a laser sensor and a black body radiation sensor, wherein said decay detector unit detects whether said metastable bubble is present or not present in said metallic base material by monitoring a cryogenic operating temperature of said system, wherein said laser sensor detects a reflected laser beam from said metastable bubble, and wherein said black body radiation sensor monitors said cryogenic operating temperature of said metallic base material or said metastable bubble via emitted black body radiation from said metastable bubble.

8. The method for energy storage as claimed in claim 7, wherein said metallic base material comprises lithium, wherein metallic base material is precompressed to provide an allowance for a volume of said metastable bubble wherein a portion of said metallic base material is in a 9R/Hex crystalline structural state, and wherein cooling of said precompressed metallic base material causes it to transform from a BCC (Body Centered Cubic) crystalline structural state to a predominately 9R/Hex crystalline structural state without substantial development of fissures caused by a size difference between the BCC and 9R/Hex crystalline structural states.

9. The method for energy storage as claimed in claim 8, wherein said metallic base material comprises metallic lithium of any isotope that is alloyed and/or doped.

10. The method for energy storage as claimed in claim 7, further comprising grouping a plurality of metastable energy storage units in a multi-storage unit system to increase the combined half-lives of the plurality of metastable energy storage units in the multi-storage unit system.

11. The method for energy storage as claimed in claim 10, wherein when a given metastable energy storage unit of the plurality of metastable energy storage units in the multi-storage unit system decays, the other metastable energy storage units in the multi-storage unit system cool down the decaying metastable energy unit and assist in resetting the decaying metastable energy unit by supplying electrical power to at least one of a laser for said decaying metastable energy unit or a magnetic field for said decaying metastable unit.

12. The method for energy storage as claimed in claim 7, further comprising:
   directing a low intensity laser beam said the metallic base material, wherein said low intensity laser beam does not substantially heat up said metallic base material; and
   detecting said laser beam reflected back to said decay detector unit.

13. A system for energy storage in a metastable energy storage unit, said system comprising:
   a metallic base material that is metallic at an operating pressure of a system and including a metastable bubble therein;
   a metastable degenerate Fermi electron gas located in said metallic base material, obeying Fermi statistics, and subjected to a magnetic field, wherein energy is stored by compression of said metastable degenerate Fermi electron gas that is subjected to said magnetic field, wherein said metallic base material is subjected to a negative pressure exerted by said magnetic field, wherein $\partial S/\partial V<0$, and wherein S is entropy of said metallic base material and V is volume of said metallic base material;
   a high pressure containment vessel containing said metallic base material and said metastable bubble;
   a cryogenic cooling system for cryogenically cooling said metallic base material in said high pressure containment vessel;
   a magnetic system for applying a magnetic field to said metallic base material in said high pressure containment vessel; and
   a decay detector unit configured to detect presence or absence of said metastable bubble and including a laser, wherein said laser emits a low intensity laser beam that illuminates, and is reflected from, said metallic base material, and wherein said decay detector unit detects a difference in a reflected light from said metallic base material at a cryogenic temperature depending on whether said metastable bubble is present or not present.

14. The system of claim 13, wherein said laser emits said low intensity laser beam into said metastable bubble at a regular interval in pulses.

15. The system of claim 14, wherein said low intensity laser beam does not measurably or substantially heat up said metallic base material when directed into said metastable bubble.

16. The system of claim 13, wherein cryogenic operating temperature of said metallic base material or said metastable bubble is monitored via its emitted black body radiation in between said pulses when said metastable bubble is not being illuminated by at least one of said decay detector unit or another decay detector unit.

17. The system of claim 13, wherein said metallic base material comprises lithium, and said metallic base material is precompressed prior to cryogenic cooling of said metallic base material to provide an allowance for a volume of said metastable bubble, wherein a major portion of said metallic base material is in a 9R/Hex crystalline structural state when cooled, and wherein cooling of said precompressed metallic base material causes it to transform from a BCC (Body Centered Cubic) crystalline structural state to a predominately 9R/Hex crystalline structural state without substantial development of fissures caused by a size difference between the BCC and 9R/Hex crystalline structural states.

18. The system of claim 17, wherein said metallic base material comprises metallic lithium of any isotope that is alloyed and/or doped.

19. The system of claim 13, wherein when a given metastable energy storage unit of the plurality of metastable energy storage units in the multi-storage unit system decays, the other metastable energy storage units in the multi-storage unit system cool down said decaying metastable energy unit and assist in resetting said decaying metastable energy unit by supplying electrical power to at least one of a laser for said decaying metastable energy unit or a magnetic field for said decaying metastable unit.

20. The system of claim 13, further including a laser for directing a laser beam through said high pressure containment vessel to vaporize said metallic base material therein to form said metastable bubble.

21. The system of claim 13, further including a processor that is responsive to said decay detector unit to reset said metastable energy storage unit if said metastable bubble is not present.

22. A method for energy storage in a metastable energy storage unit comprising:
   subjecting a metallic base material to a high pressure in a high pressure containment vessel;
   precompressing said metallic base material prior to cryogenic cooling of said metallic base material;
   cryogenically cooling said metallic base material in said high pressure containment vessel;
   subjecting said metallic base material to a negative pressure exerted by a magnetic field, wherein $\partial S/\partial V<0$, and wherein S is entropy of said metallic base material and V is volume of said metallic base material;
   forming a metastable bubble in said metallic base material, wherein a degenerate electron gas that obeys Fermi statistics is formed within said metallic base material;
   applying a magnetic field to said metallic base material in said high pressure containment vessel to produce a compression of the metastable degenerate Fermi electron gas in the metallic base material; and
   detecting whether said metastable bubble is present or not in said metallic base material by employing a decay detector unit including a laser sensor, wherein a laser emits a low intensity laser beam that illuminates, and is reflected from, said metallic base material, and wherein said decay detector unit detects a difference in a reflected light from said metallic base material at a cryogenic temperature depending on whether said metastable bubble is present or not present.

23. The method of claim 22, wherein said laser emits said low intensity laser beam into said metastable bubble at a regular interval in pulses, and wherein said low intensity laser beam does not measurably or substantially heat up said metallic base material when directed into said metastable bubble.

24. The method of claim 22, wherein cryogenic operating temperature of said metallic base material or said metastable bubble is monitored via its emitted black body radiation in between said pulses when said metastable bubble is not being illuminated by at least one of said decay detector unit or another decay detector unit.

25. The method of claim 22, wherein said metallic base material comprises metallic lithium of any isotope that is alloyed and/or doped.

26. The method of claim 22, further comprising grouping a plurality of metastable energy storage units in a multi-storage unit system to increase the combined half-lives of the plurality of metastable energy storage units in the multi-storage unit system.

27. The method of claim 26, wherein when a given metastable energy storage unit of the plurality of metastable energy storage units in the multi-storage unit system decays, the other metastable energy storage units in the multi-storage unit system cool down the decaying metastable energy unit and assist in resetting the decaying metastable energy unit by supplying electrical power to at least one of a laser for said decaying metastable energy unit or a magnetic field for said decaying metastable unit.

28. The method of claim 22, further comprising directing a laser beam from another laser through said high pressure containment vessel to vaporize said metallic base material therein to form said metastable bubble.

29. The method of claim 22, further comprising resetting said metastable energy storage unit if said metastable bubble is not present by employing a processor that is responsive to said decay detector unit.

\* \* \* \* \*